United States Patent
Morimoto et al.

(10) Patent No.: US 9,731,752 B2
(45) Date of Patent: Aug. 15, 2017

(54) STEERING CONTROL DEVICE FOR VEHICLE AND STEERING CONTROL METHOD FOR VEHICLE

(71) Applicant: NISSAN MOTOR CO., LTD., Yokohama-shi, Kanagawa (JP)

(72) Inventors: Akira Morimoto, Kanagawa (JP); Masahiko Kikuchi, Kanagawa (JP); Daisuke Oki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 66 days.

(21) Appl. No.: 14/907,375

(22) PCT Filed: Jun. 4, 2014

(86) PCT No.: PCT/JP2014/064856
§ 371 (c)(1),
(2) Date: Jan. 27, 2016

(87) PCT Pub. No.: WO2015/011996
PCT Pub. Date: Jan. 29, 2015

(65) Prior Publication Data
US 2016/0167702 A1    Jun. 16, 2016

(30) Foreign Application Priority Data
Jul. 26, 2013    (JP) ................. 2013-155401

(51) Int. Cl.
*B62D 5/04*     (2006.01)
*B62D 1/00*     (2006.01)
(Continued)

(52) U.S. Cl.
CPC ......... *B62D 5/0469* (2013.01); *B62D 15/021* (2013.01); *B62D 15/025* (2013.01);
(Continued)

(58) Field of Classification Search
CPC . B62D 6/00; B62D 5/06; B62D 5/065; B62D 1/00; B62D 1/28; B62D 5/006;
(Continued)

(56) References Cited

U.S. PATENT DOCUMENTS

| 5,086,859 A | 2/1992 | Takahashi et al. |
| 2002/0007236 A1* | 1/2002 | Sadano ................ B62D 1/28 701/28 |

(Continued)

FOREIGN PATENT DOCUMENTS

| CN | 1657352 A | 8/2005 |
| DE | 102006003428 A1 | 7/2007 |

(Continued)

*Primary Examiner* — Behrang Badii
(74) *Attorney, Agent, or Firm* — Young Basile Hanlon & MacFarlane, P.C.

(57) ABSTRACT

A steering control device for a vehicle controls a steering device having a steering mechanism and a drive unit configured to provide the steering mechanism with steering force for the wheels. The steering control device includes a detection unit to detect the steering angle; and a control unit to calculate a target value of a current to be supplied to the drive unit as a current command value, and execute automatic steering control to automatically control steering of the vehicle by causing the drive unit to be supplied with the current of the current command value. When an absolute value of the steering angle comes to a predetermined first threshold or more during the automatic steering control, the control unit decreases an upper limit value of an absolute value of the current command value as the absolute value of the steering angle increases.

6 Claims, 5 Drawing Sheets

(51) Int. Cl.

| | |
|---|---|
| B62D 6/02 | (2006.01) |
| B62D 1/28 | (2006.01) |
| B62D 6/00 | (2006.01) |
| B62D 5/065 | (2006.01) |
| G06F 19/00 | (2011.01) |
| B62D 5/06 | (2006.01) |
| B62D 5/00 | (2006.01) |
| B62D 6/04 | (2006.01) |
| B62D 1/04 | (2006.01) |
| G01M 17/06 | (2006.01) |
| G08G 1/16 | (2006.01) |
| B62D 15/02 | (2006.01) |

(52) U.S. Cl.
CPC ............... *B62D 1/00* (2013.01); *B62D 1/046* (2013.01); *B62D 1/28* (2013.01); *B62D 1/286* (2013.01); *B62D 5/006* (2013.01); *B62D 5/0463* (2013.01); *B62D 5/0472* (2013.01); *B62D 5/06* (2013.01); *B62D 5/065* (2013.01); *B62D 6/00* (2013.01); *B62D 6/008* (2013.01); *B62D 6/02* (2013.01); *B62D 6/04* (2013.01); *B62D 15/0285* (2013.01); *G01M 17/06* (2013.01); *G06F 19/00* (2013.01); *G08G 1/163* (2013.01)

(58) Field of Classification Search
CPC . B62D 6/008; B62D 6/02; B62D 5/04; B62D 5/0469; B62D 6/0463; B62D 1/286; B62D 15/021; B62D 15/025; B62D 5/0472; B62D 4/0466; B62D 11/183; G06F 19/00; B60K 23/0808; B63H 20/12
See application file for complete search history.

(56) References Cited

U.S. PATENT DOCUMENTS

| | | | |
|---|---|---|---|
| 2003/0144782 A1* | 7/2003 | Shimizu | B62D 6/02 |
| | | | 701/41 |
| 2005/0205345 A1 | 9/2005 | Hayashi | |
| 2006/0080016 A1* | 4/2006 | Kasahara | B62D 5/006 |
| | | | 701/41 |
| 2007/0288145 A1 | 12/2007 | Maeda et al. | |
| 2012/0120008 A1 | 5/2012 | Mori | |
| 2013/0233639 A1* | 9/2013 | Kodato | B62D 5/0463 |
| | | | 180/446 |
| 2013/0304327 A1* | 11/2013 | Morishita | B62D 5/0463 |
| | | | 701/43 |
| 2014/0343791 A1* | 11/2014 | Suzuki | B62D 5/0469 |
| | | | 701/41 |

FOREIGN PATENT DOCUMENTS

| | | |
|---|---|---|
| FR | 2897823 A1 | 8/2007 |
| JP | 2007-223456 A | 9/2007 |
| JP | 2007-331479 A | 12/2007 |
| JP | 2009-089898 A | 4/2009 |
| JP | 2010-213401 A | 9/2010 |
| JP | 2011-102087 A | 5/2011 |
| JP | 2011-126477 A | 6/2011 |

\* cited by examiner (A)

(B)

(A)

(B)

(A)

(B)

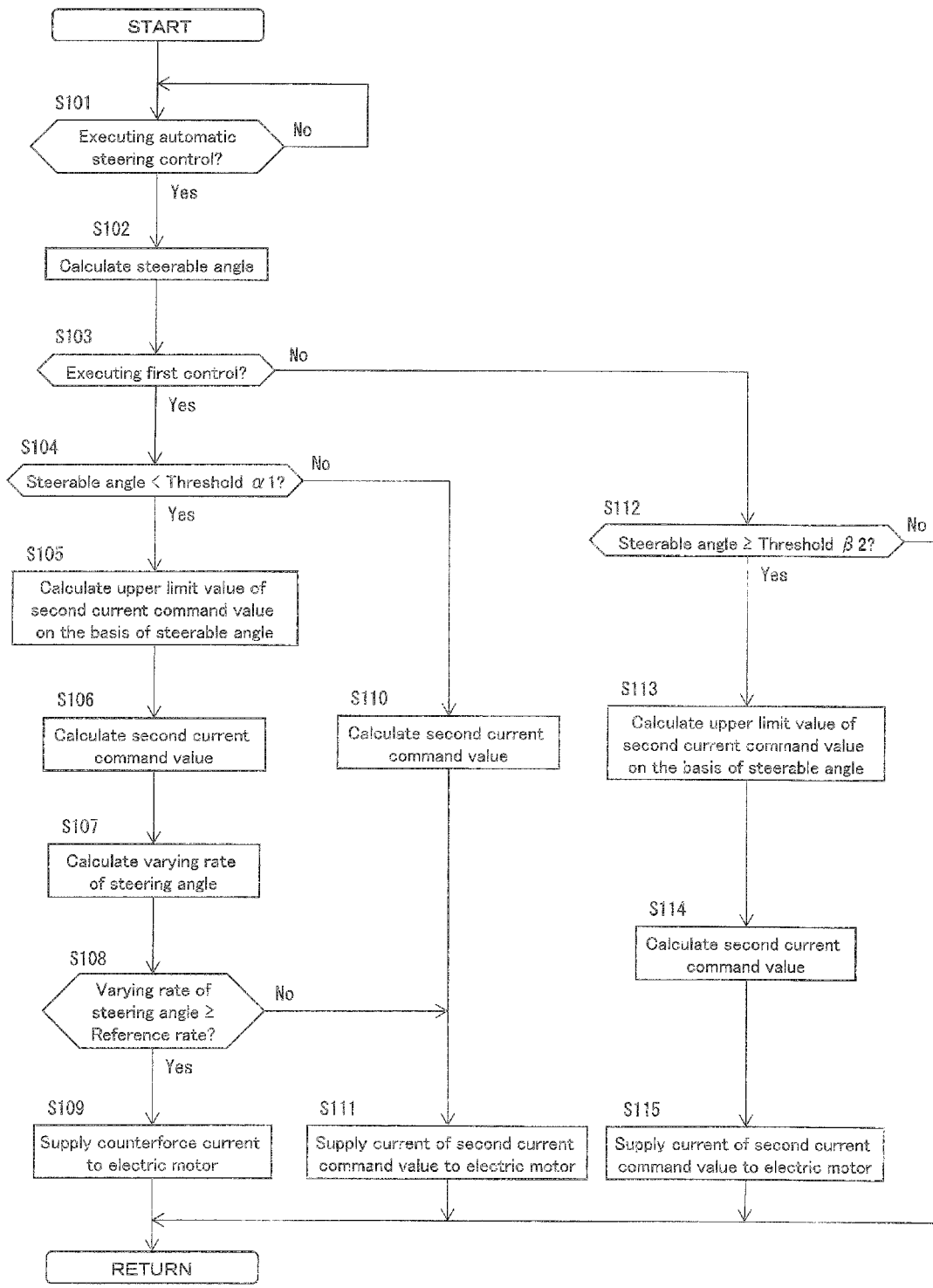

STEERING CONTROL DEVICE FOR VEHICLE AND STEERING CONTROL METHOD FOR VEHICLE

CROSS REFERENCE TO RELATED APPLICATION

The present application claims priority to Japanese Patent Application No. 2013-155401 (filed Jul. 26, 2013), the entire content of which is herein incorporated by reference.

TECHNICAL FIELD

The present invention relates to a steering control device for a vehicle and a steering control method for a vehicle.

BACKGROUND

As a prior art, there is known a steering control device for a vehicle, which can execute automatic steering control to automatically control steering of the vehicle (see JP 2007-331479A).

According to the prior art, however, when the steering is automatically performed in the automatic steering control, the steering mechanism may reach a critical point (mechanical limit) of a mechanistic steerable range. This may give an uncomfortable feeling to the driver because the steering operation by the steering mechanism is unexpectedly released against the driver's intention.

SUMMARY

Problems to be solved by the present invention include providing a steering control device for a vehicle which can appropriately execute the automatic steering control.

The present invention solves the above problems as below. In automatic steering control, the upper limit value of the absolute value of a current command value decreases as the absolute value of a steering angle increases when the absolute value of the steering angle comes to a first threshold or more.

According to the present invention, when the absolute value of the steering angle comes to the first threshold or more, the upper limit value of the absolute value of the current command value decreases as the absolute value of the steering angle increases. It allows the steering angle to moderately vary before the steering mechanism reaches the mechanical limit. This can mitigate an uncomfortable feeling given to the driver due to the steering operation by the steering mechanism being unexpectedly released against the driver's intention.

BRIEF DESCRIPTION OF THE DRAWINGS

FIG. 5 is a flowchart showing a steering control process according to the present embodiment.

DETAILED DESCRIPTION OF THE EMBODIMENTS

Hereinafter, embodiments of the present invention will be described with reference to the drawings. In the following descriptions, the present invention will be described by exemplifying a steering control device which is equipped in a vehicle and which can automatically control the steering operation thereby to guide the vehicle to a target position without the driver's steering operation.

Figure 1:
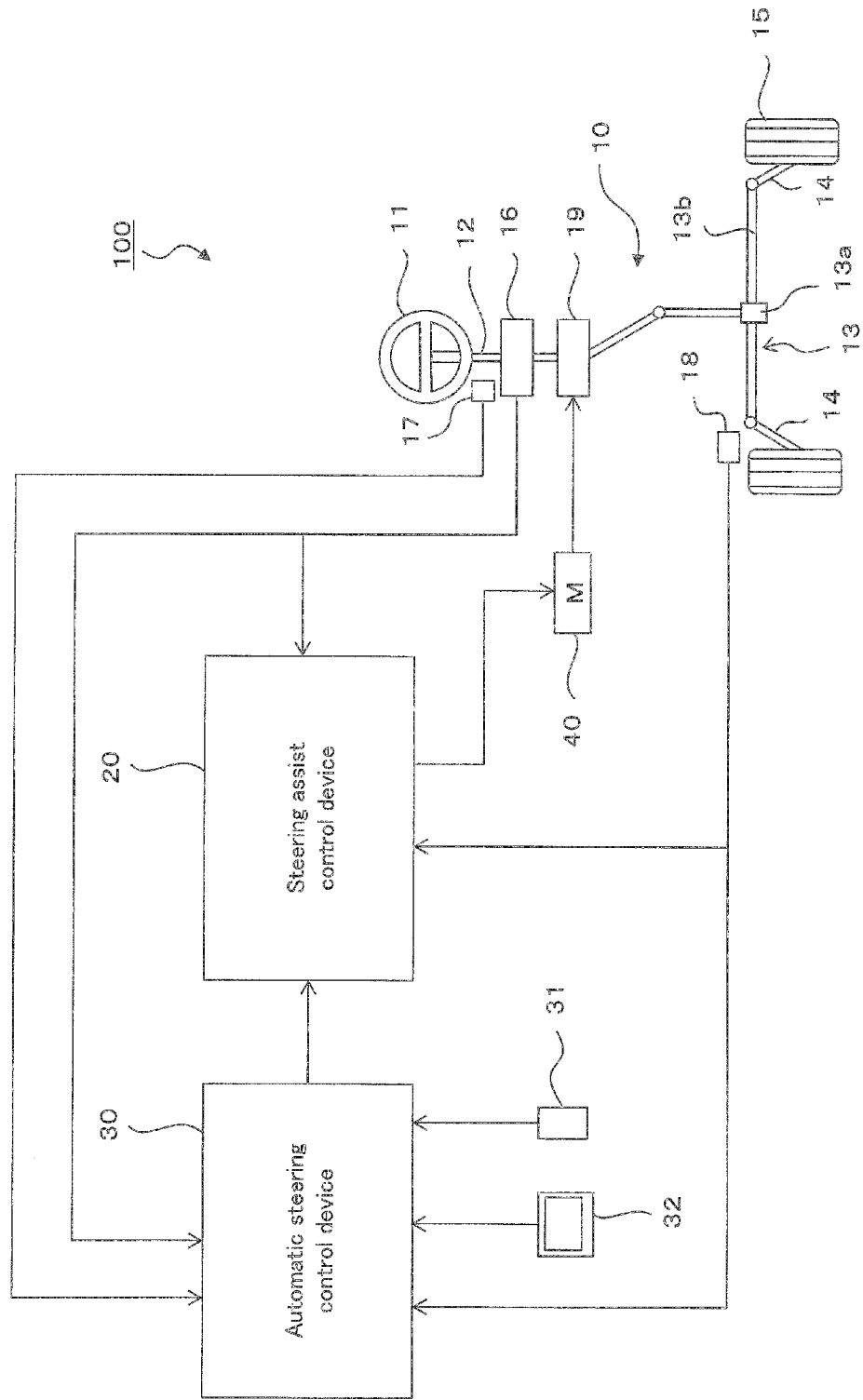
FIG. 1 is a schematic diagram showing a steering control device according to an embodiment of the present invention.

FIG. 1 is a schematic diagram which shows a steering control device 100 according to the present embodiment. As shown in FIG. 1, the steering control device 100 comprises a steering device 10, a steering assist control device 20, an automatic steering control device 30, an automatic steering control switch 31, a display 32, and an electric motor 40.

The steering device 10 has an electric power steering function and steers wheels (e.g., right and left front wheels) 15 in accordance with the steering angle of a steering wheel 11 when the steering wheel 11 is operated by a driver.

Specifically in the steering device 10, a steering system between the steering wheel 11 and the wheels 15 is mechanically connected and mainly constituted of a steering shaft 12, a rack gear and pinion gear mechanism 13, and tie rods 14. The steering wheel 11 is attached to the upper end of the steering shaft 12. The rack gear and pinion gear mechanism 13 is connected with the lower end of the steering shaft 12. A pinion gear 13a is attached to the lower end of a pinion shaft which is connected to the steering shaft 12. The pinion gear 13a meshes with a rack gear 13b which is provided to extend in the vehicle width direction. The rack gear and pinion gear mechanism 13 converts the rotational motion of the steering wheel 11 (steering shaft 12) into linear motion (translational motion) of the rack gear 13b. Both ends of the rack gear 13b are connected to respective knuckle arms (not shown) which are provided at the wheels 15 via the tie rods 14. The linear motion (translational motion) of the rack gear 13b thus allows steering of the wheels 15.

A torque sensor 16 is provided to detect a steering torque which corresponds to a steering input force by the driver. The steering torque detected by the torque sensor 16 is output to the steering assist control device 20 and the automatic steering control device 30.

A steering angle sensor 17 is provided on or near the steering shaft 12. The steering angle sensor 17 detects a rotation angle of the steering shaft 12 as a steering angle. The steering angle detected by the steering angle sensor 17 represents a steering angle of the steering wheel 11. In the present embodiment, a steering angle when steering right is output as a positive value, and a steering angle when steering left is output as a negative value, provided that the neutral position of the steering wheel 11 is represented by "0." The steering angle detected by the steering angle sensor 17 is output to the steering assist control device 20 and the automatic steering control device 30.

A vehicle speed sensor 18 is provided to detect a rotating state of the wheels 15. The vehicle speed sensor 18 thereby outputs vehicle speed pulses in accordance with the rotating state of the wheels 15. For example, the vehicle speed sensor 18 detects the rotation of a gear attached to the center of a wheel by using a magnetic sensor (not shown) and can output the vehicle speed pulses. The vehicle speed pulses are output from the vehicle speed sensor 18 to the steering assist control device 20 and the automatic steering control device 30.

The electric motor 40 converts the electric power supplied from an onboard battery (not shown) into a torque. The value of a current to be supplied to the electric motor 40 is determined by the steering assist control device 20 or the automatic steering control device 30, as will be described later. Electric power corresponding to a current value determined by the steering assist control device 20 or the automatic steering control device 30 is supplied from the onboard battery to the electric motor 40.

The electric motor 40 is supplied with the electric power from the onboard battery. The electric motor 40 generates a torque in accordance with the value of a current supplied from the onboard battery and transmits the generated torque to a decelerator 19. The torque transmitted to the decelerator 19 is converted into a rotating torque for the steering shaft 12. This allows to provide the steering device 10 with steering power in accordance with the current value.

The steering assist control device 20 is a device for assisting the steering operation by the driver via the steering device 10. The steering assist control device 20 comprises a microcomputer which is mainly constituted of a CPU, a ROM, a RAM, and an I/O interface. The steering assist control device 20 controls driving of the electric motor 40 in accordance with a control program stored in the ROM thereby to perform steering assist control to assist the steering force of the driver.

Specifically, the steering assist control device 20 has steering assist characteristics in which the relationship among a steering torque, a vehicle speed and a current command value is predetermined. The steering assist control device 20 calculates a current command value (details will be described later), which is a target value of a current to be supplied to the electric motor 40, on the basis of steering assist characteristics. In the descriptions below, the current command value calculated by the steering assist control device 20 will be referred to as a first current command value.

After calculating the first current command value, the steering assist control device 20 controls the onboard battery (not shown) to supply the electric motor 40 with electric power corresponding to the calculated first current command value. In the above described manner, the steering assist control device 20 calculates the target value of a current to be supplied to the electric motor 40 as the first current command value, on the basis of the steering torque and the vehicle speed. The onboard battery thereby supplies the electric power to the electric motor 40 at the current of the first current command value calculated by the steering assist control device 20. Thus, the steering assist control device 20 can allow the steering device 10 to be supplied with the steering power for assisting the steering operation of the driver.

In the present embodiment, the steering assist characteristics may be preliminarily stored in the ROM of the steering assist control device 20 in a form of a control map or an arithmetic expression. The steering assist characteristics are configured such that, as the steering torque is lager, the absolute value of the first current command value is lager, and as the vehicle speed is higher, the absolute value of the first current command value is smaller. In addition, the steering assist characteristics are configured such that a positive first current command value is obtained when steering right while a negative first current command value is obtained when steering left depending on the steering angle and the steering angular velocity.

Next, the automatic steering control device 30 will be described. The automatic steering control device 30 comprises a microcomputer which is constituted of a CPU, a ROM, a RAM, and an I/O interface. The automatic steering control device 30 controls driving of the electric motor 40 in accordance with a control program stored in the ROM. The automatic steering control device 30 thereby performs automatic steering control to automatically control the steering operation of the steering device 10.

Specifically, when the driver turns on the automatic steering control switch 31, the automatic steering control device 30 calculates a target steering angle required for the vehicle to be guided to a target position and also calculates a target value of a current required to be supplied to the electric motor 40 as a second current command value.

Here, a method for calculating the second current command value in a scene of guiding the vehicle to a target parking position will be described. For example, in the present embodiment, an image captured by a camera is displayed on the screen of a display 32 which is disposed on the instrument panel. The driver can set the target parking position by referring to the image displayed on the screen of the display 32 and operating a touch panel provided with the display 32. After the target parking position is set by the driver, the automatic steering control device 30 calculates the positional relationship between the present position of the vehicle and the target parking position and further calculates a target traveling route for parking at the target parking position. The automatic steering control device 30 also calculates a necessary target steering angle on the basis of the target traveling route and the present position of the vehicle, and further calculates the value of a current required for the electric motor 40 to be supplied to achieve that target steering angle, as the second current command value. The second current command value calculated by the automatic steering control device 30 is then output to the steering assist control device 20.

When the automatic steering control switch 31 is turned on, the automatic steering control device 30 outputs a start signal for the automatic steering control to the steering assist control device 20. This changes the steering control mode of the steering assist control device 20 to an automatic steering control mode. The electric motor 40 is supplied with a current of the second current command value output from the automatic steering control device 30, under the control by the steering assist control device 20. Consequently, the current of the second current command value calculated by the automatic steering control device 30 is converted into a steering torque in the electric motor 40, and the steering torque is transmitted as a steering force to the steering device 10.

In the present embodiment, the positive and negative of the second current command value are determined such that a positive second current command value is obtained when steering right while a negative second current command value is obtained when steering left. In the descriptions below, a scene when steering right will be exemplified to describe in detail a control method for the second current command value.

For structural reasons, the steering device 10 has a critical point (referred to as a "mechanical limit" hereinafter) of a mechanistic steerable range within which the wheels 15 are mechanically/physically steerable. According to the prior art, therefore, when the steering angle becomes large in the automatic steering control, the steering operation by the steering device 10 is unexpectedly released (suspended, stopped) at the mechanical limit, which may give an uncomfortable feeling to the driver.

To mitigate such an uncomfortable feeling given to the driver, according to the present embodiment, the automatic steering control device 30 sets a first threshold $\alpha 1$ which is a steering angle just before the steering device 10 reaches the mechanical limit. The automatic steering control device 30 determines whether the steering angle comes to the first threshold or more, when the automatic steering control is started. When the steering angle comes to the first threshold or more, the automatic steering control device 30 controls the upper limit value of the second current command value such that the upper limit value of the second current command value decreases as the steering angle increases. This is to allow the steering angle to moderately vary.

In the present embodiment, the automatic steering control device 30 determines whether the steering angle has come to the first threshold or more through: calculating an angle difference between the present steering angle and a steering angle at the mechanical limit as a steerable angle; and determining that the steering angle is the first threshold or more when the steerable angle is less than the threshold $\alpha 1$. Since the steering angle when the steering device 10 reaches the mechanical limit can be decided depending on the type of vehicle, the automatic steering control device 30 can calculate the steerable angle on the basis of the present steering angle.

Figure 2:
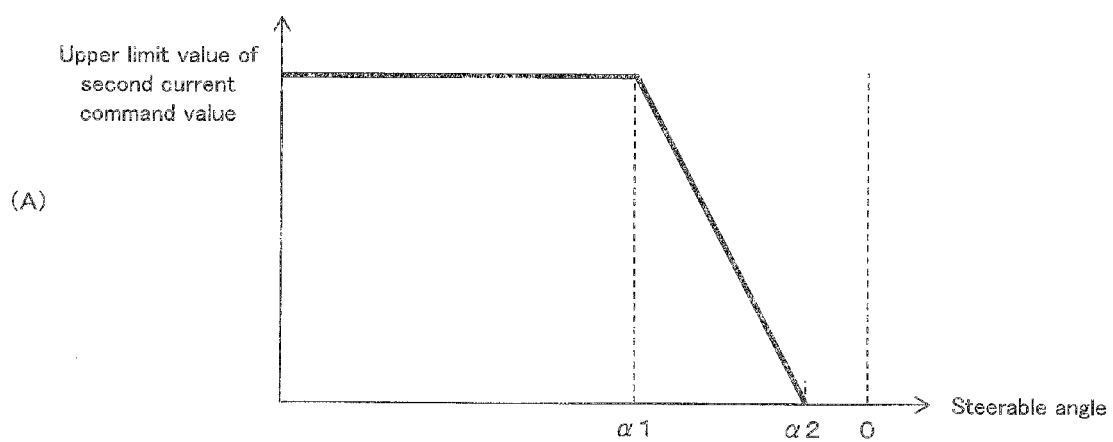
FIG. 2(A) is a graph showing the relationship between the upper limit value of a second current command value and a steerable angle in a first control.
FIG. 2(B) is a graph showing the relationship between the upper limit value of the second current command value and the steerable angle in a second control.
Figure 2:
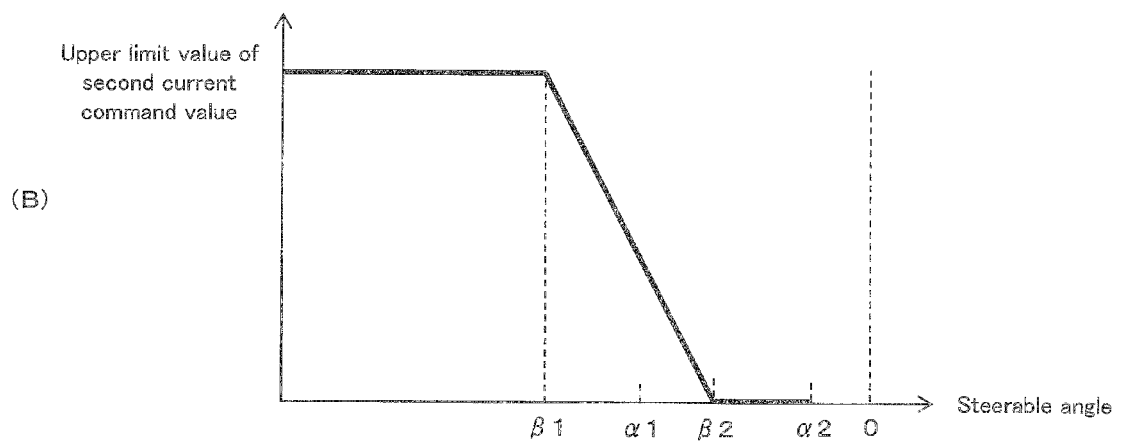

FIG. 2(A) is a graph which shows the relationship between the upper limit value of the second current command value and the steerable angle when steering right. Horizontal axis in FIG. 2(A) represents the steerable angle, where the steerable angle decreases from the left direction (opposite direction to the horizontal arrow direction) side to the right direction (horizontal arrow direction) side.

As shown in FIG. 2(A), when the steerable angle is not less than the threshold $\alpha 1$, the automatic steering control device 30 sets the upper limit value of the second current command value to an initial value. When the steerable angle comes to less than the threshold $\alpha 1$, the automatic steering control device 30 starts suppression of the upper limit value of the second current command value. When the steerable angle is less than the threshold $\alpha 1$ and not less than a threshold $\alpha 2$ which is smaller than the threshold $\alpha 1$, the automatic steering control device 30 decreases the upper limit value of the second current command value as the steerable angle decreases, and when the steerable angle comes to the threshold $\alpha 2$, the automatic steering control device 30 sets the upper limit value of the second current command value to zero.

The correspondence relationship between the steerable angle and the upper limit value of the second current command value is preliminarily stored in the RAM of the automatic steering control device 30 in a form of a table or map. The automatic steering control device 30 refers to the correspondence relationship between the steerable angle and the upper limit value of the second current command value stored in the RAM and can thereby calculate the upper limit value of the second current command value on the basis of the steerable angle.

Figure 3:
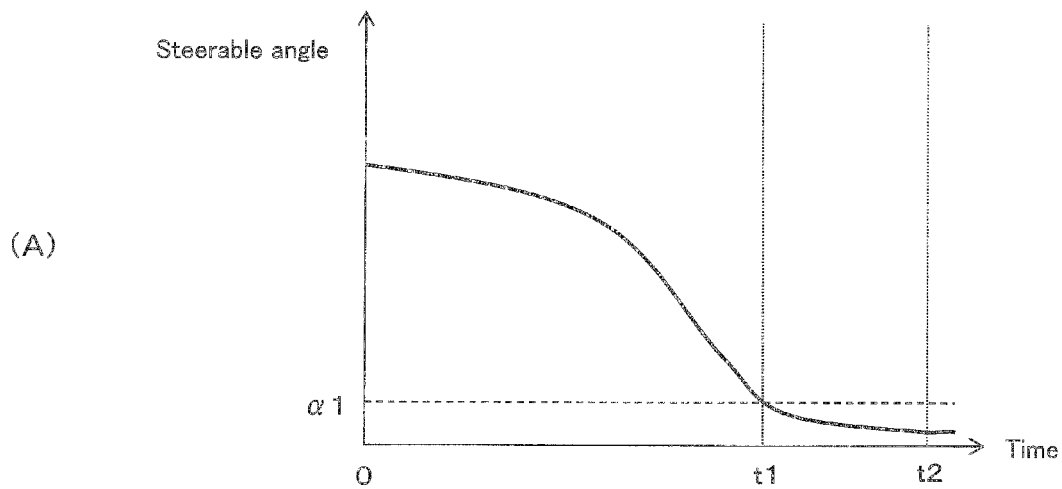
FIG. 3(A) is a graph showing an example of transition of the steerable angle.
FIG. 3(B) is a graph showing an example of transition of the second current command value in the scene shown in FIG. 3(A)
Figure 3:
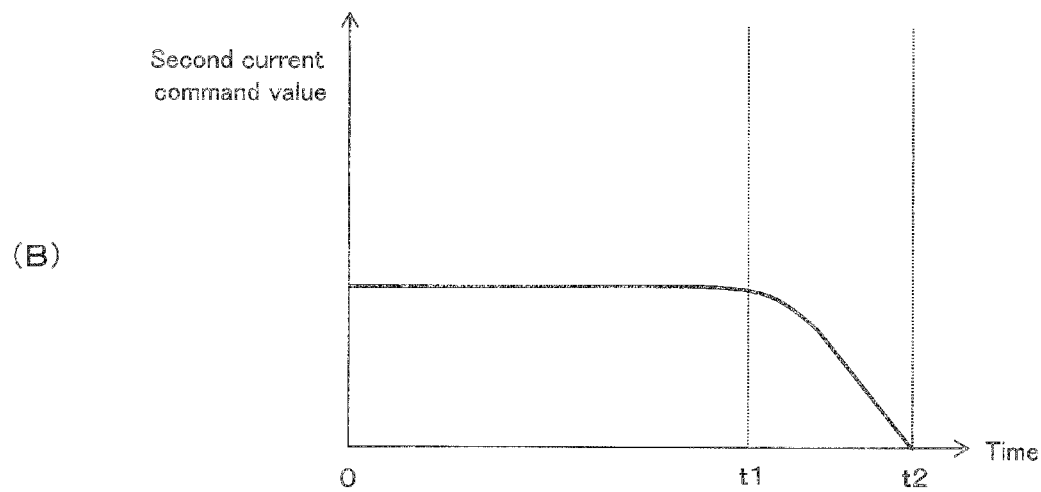

Thus, in the present embodiment, the upper limit value of the second current command value decreases as the steering angle increases (as the steerable angle decreases) before the steering device 10 reaches the mechanical limit, and an actual value of the second current command value can thereby be suppressed as shown in FIG. 3(B). This allows the steering angle to moderately vary as shown in FIG. 3(A). In addition, when the steerable angle comes to the threshold $\alpha 2$ as shown in FIG. 2(A), the upper limit value of the second current command value is set to zero, so that the actual value of the second current command value also comes to zero as shown in FIG. 3(B). As a result, as shown in FIG. 3(A), the steering operation of the steering device 10 can be released before the steering device 10 reaches the mechanical limit. Here, FIG. 3(A) is a graph which shows an example of transition of the steerable angle, and FIG. 3(B) is a graph which shows an example of transition of the second current command value.

For example, in the example shown in FIG. 3(B), a positive second current command value to respond to right steering is calculated in order to guide the vehicle to a target position, and the electric motor 40 is supplied with a current of the positive second current command value. This gives a rightward steering force to the steering device 10, and the rightward steering angle increases. On the other hand, as the steering angle increases, the steerable angle, which is the angle difference between the present steering angle and the steering angle at the mechanical limit, decreases as shown in FIG. 3(A). As a result, the steerable angle comes to less than the threshold $\alpha 1$ at a time t1.

When the steerable angle comes to less than the threshold $\alpha 1$ at the time t1, the automatic steering control device 30 decreases the upper limit value of the second current command value in accordance with the steerable angle as shown in FIG. 2(A). This suppresses the actual value of the second current command value as shown in FIG. 3(B). Furthermore, when the steerable angle comes to the threshold $\alpha 2$ and the upper limit value of the second current command value comes to zero, the actual value of the second current command value also comes to zero, as shown in FIG. 3(B), which releases the steering of the steering device 10 before the steering device 10 reaches the mechanical limit (before the steerable angle comes to zero), as shown in FIG. 3(A).

In this manner, when the steering angle exceeds the predetermined first threshold (when the steerable angle comes to less than the threshold $\alpha 1$), the automatic steering control device 30 can allow the steering angle to moderately vary. It effectively prevents a driver from feeling uncomfortable, which would be caused from unexpected release of the steering of the steering device 10 by reaching the physical or mechanical limit against the driver's intention.

In the present embodiment, the automatic steering control device 30 repeatedly calculates a varying rate of the steering angle and determines whether the varying rate of the steering angle is a predetermined reference rate or more. When the steerable angle is less than the threshold $\alpha 1$ and the varying rate of the steering angle comes to the reference rate or more, the automatic steering control device 30 causes the electric motor 40 to be supplied with a current (counterforce current) which has the opposite positive/negative sign to that of the second current command value corresponding to the present steering direction.

Figure 4:
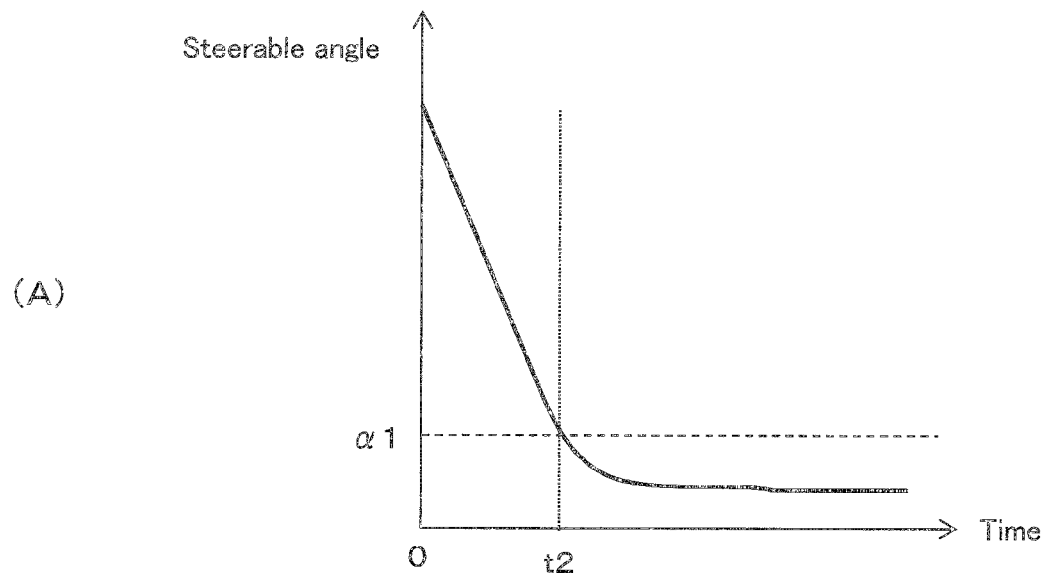
FIG. 4(A) is a graph showing another example of transition of the steerable angle.
FIG. 4(B) is a graph showing another example of transition of the second current command value in the scene shown in FIG. 4(A)
Figure 4:
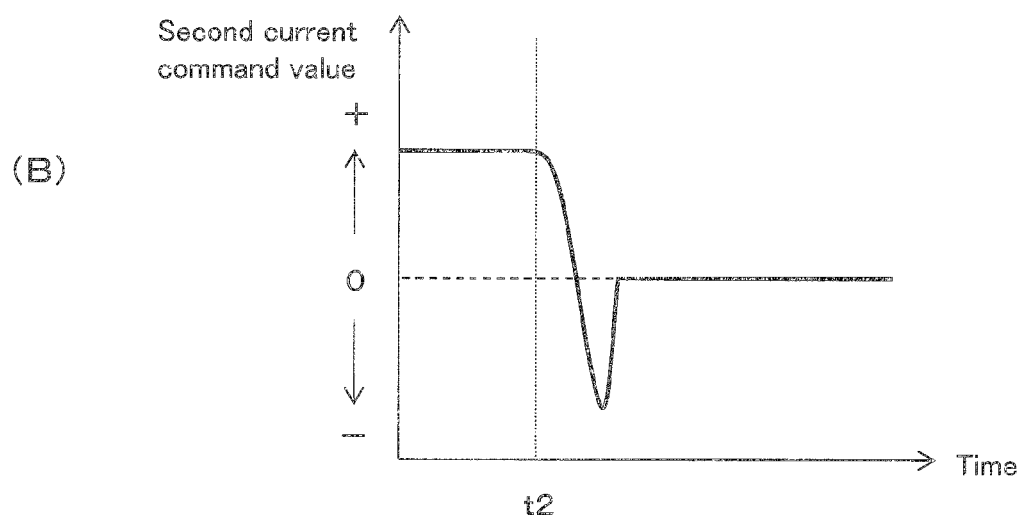

Here, FIG. 4(A) is a graph which shows another example of transition of the steerable angle, and FIG. 4(B) is a graph which shows another example of transition of the second current command value in the scene shown in FIG. 4(A). For example, in the example shown in FIG. 4(B), the electric motor 40 is supplied with a current of a positive second current command value to steer the vehicle right, and the steerable angle accordingly comes to less than the threshold $\alpha 1$ as shown in FIG. 4(A). In the example shown in FIG. 4, the varying rate of the steering angle is the reference rate or more, and the automatic steering control device 30 accordingly causes the electric motor 40 to be supplied with a current of a negative second current command value as the counterforce current, as shown in FIG. 4(B). In this manner, when the varying rate of the steering angle is the reference rate or more, the electric motor 40 is supplied with a counterforce current which has the opposite positive/negative sign to that of the second current command value corresponding to the present steering direction. It is thereby possible to effectively prevent the steering device 10 from reaching the mechanical limit such as due to inertial force of the electric motor 40 even when the second current command value is set to zero.

The value of the counterforce current is not particularly limited, but the absolute value of the counterforce current can be increased as the varying rate of the steering angle increases. The reference rate is also not particularly limited, and can be set at a rate which is obtained as a maximum varying rate of the steering angle at which the steering device 10 does not reach the mechanical limit even when the counterforce current is not supplied to the electric motor 40.

In the present embodiment, the automatic steering control device 30 executes a first control which includes: control of the upper limit value of the second current command value before the steerable angle comes to less than the threshold $\alpha 1$; and control of the upper limit value of the second current command value after the steerable angle has come to less than the threshold $\alpha 1$ and before the steerable angle comes to the threshold $\alpha 2$ smaller than the threshold $\alpha 1$, as shown in FIG. 2(A). The automatic steering control device 30 further executes a second control which includes control of the upper limit value of the second current command value after the steerable angle has come to the threshold $\alpha 2$ and before the steerable angle comes back to a threshold $\beta 1$ due to performing the steering operation in the opposite direction, as shown in FIG. 2(B).

As shown in FIG. 2(B), the thresholds $\beta 1$ and $\beta 2$ in the second control are set to larger values than the thresholds $\alpha 1$ and $\alpha 2$, respectively, in the first control shown in FIG. 2(A). According to this setting, the first control in which the steering device 10 comes close to the mechanical limit and the second control in which the steering device 10 comes away from the mechanical limit can be provided with a hysteresis. It can effectively prevent the hunting of the steering device 10 such as due to noises.

Specifically in the second control, when the steerable angle is less than the threshold $\beta 2$ larger than the threshold $\alpha 2$ as shown in FIG. 2(B), the automatic steering control device 30 maintains the setting of the upper limit value of the second current command value at zero. In addition, when the steerable angle is the threshold $\beta 2$ or more and less than the threshold $\beta 1$ larger than the threshold $\alpha 1$ as shown in FIG. 2(B), the automatic steering control device 30 increases the upper limit value of the second current command value as the steerable angle increases. When the steerable angle comes to the threshold $\beta 1$ or more, the automatic steering control device 30 sets the upper limit value of the second current command value at the initial value.

While the above embodiment has been described by exemplifying the scene when steering right, the control in the scene when steering left can also be performed in the same manner. In the present embodiment, the steering angle when steering right is output as a positive value and the steering angle when steering left is output as a negative value. The second current command value to give a rightward steering force to the electric motor 40 is output as a positive value and the second current command value to give a leftward steering force to the electric motor 40 is output as a negative value. When steering left, therefore, the positive and negative signs of the steering angle, steerable angle, second current command value, thresholds $\alpha 1$, $\alpha 2$, $\beta 1$ and $\beta 2$, counterforce current, and other necessary variables are opposite to those when steering right. In an alternative embodiment, another configuration may be employed in which, regardless of whether steering right or left, the absolute value of the steering angle and the absolute value of the steerable angle are used to obtain the upper limit value of the absolute value of the second current command value.

When the automatic steering control switch 31 is turned off, the automatic steering control device 30 outputs a release signal for the automatic steering control to the steering assist control device 20. This changes the control mode of the steering assist control device 20 to a steering assist control mode. In the steering assist mode, the automatic steering control based on the second current command value calculated by the automatic steering control device 30 is released, and the steering assist control based on the first current command value calculated by the steering assist control device 20 is started. When the driver intervenes into the steering operation during the automatic steering control, the automatic steering control device 30 also releases the automatic steering control.

Next, with reference to FIG. 5, a steering control process or sequence according to the present embodiment will be described. FIG. 5 is a flowchart for explaining the steering control process according to the present embodiment. The scene when steering right will be exemplified in the descriptions below, but the process can also be carried out in the same manner when steering left.

First, in step S101, the automatic steering control device 30 determines whether the automatic steering control is being executed. For example, the automatic steering control device 30 can determine that the automatic steering control is being executed if the automatic steering control switch 31 is turned on and the automatic steering control is not released such as due to the driver intervening into the steering operation. If it is determined that the automatic steering control is being executed, the process proceeds to step S102, while if it is determined that the automatic steering control is not being executed, the process waits in step S101.

In step S102, the automatic steering control device 30 calculates the steerable angle. Specifically, the automatic steering control device 30 periodically acquires the steering angle detected by the steering angle sensor 17, and calculates an angle difference between the latest steering angle and the steering angle when the steering device 10 reaches the mechanical limit, as the steerable angle.

In step S103, the automatic steering control device 30 determines whether the first control is being executed. For example, before the steerable angle comes to less than the threshold $\alpha 1$, or after the steerable angle has come to less than the threshold $\alpha 1$ and before the steerable angle comes to the threshold $\alpha 2$, as shown in FIG. 2(A), the automatic steering control device 30 determines that the first control is being executed, and the process proceeds to step S104. On the other hand, after the steerable angle has come to the threshold $\alpha 2$ and before the steerable angle comes back to the threshold $\beta 1$, as shown in FIG. 2(B), the automatic steering control device 30 determines that the second control is being executed, and the process proceeds to step S112.

In step S104, the automatic steering control device 30 determines whether the steerable angle is less than the threshold $\alpha 1$. For example, if the steerable angle is less than the threshold $\alpha 1$ as shown in FIG. 2(A), the process proceeds to step S105, while if the steerable angle is not less than the threshold α1, the process proceeds to step S110.

In step S105, the automatic steering control device 30 calculates the upper limit value of the second current command value. Specifically, the automatic steering control device 30 refers to the correspondence relationship between the steerable angle and the upper limit value of the second current command value stored in the RAM of the automatic steering control device 30. The automatic steering control device 30 can thereby calculate the upper limit value of the second current command value on the basis of the steerable angle calculated in step S102. In addition, as shown in FIG. 2(A), when the steerable angle is larger than the threshold α2, the automatic steering control device 30 calculates the upper limit value of the second current command value as a smaller value as the steerable angle is smaller. When the steerable angle is the threshold α2, the automatic steering control device 30 calculates the upper limit value of the second current command value as zero.

In step S106, the automatic steering control device 30 calculates the second current command value within a range which is not beyond the upper limit value of the second current command value set in step S105. For example, the automatic steering control device 30 calculates a target steering angle on the basis of the target traveling route to a target position and the present position of the vehicle. The automatic steering control device 30 further calculates the target value of a current required for the electric motor 40 to be supplied to achieve that target steering angle, as the second current command value. The automatic steering control device 30 then compares the calculated second current command value with the upper limit value of the second current command value set in step S105. If the calculated second current command value is larger than the upper limit value of the second current command value, the automatic steering control device 30 calculates the upper limit value of the second current command value as the second current command value.

In step S107, the automatic steering control device 30 calculates the varying rate of the steering angle. For example, the automatic steering control device 30 can calculates the varying rate of the steering angle on the basis of the steering angle detected at the time of the previous processing and the steering angle detected at the time of the present processing.

In step S108, the automatic steering control device 30 determines whether the varying rate of the steering angle calculated in step S107 is a predetermined reference rate or more. If the varying rate of the steering angle is less than the reference rate, the process proceeds to step S111, in which the second current command value calculated in step S106 is output to the steering assist control device 20. Through this operation, the electric motor 40 is supplied with a current of the second current command value calculated in step S106, and the steering device 10 performs steering operation. After the electric motor 40 is supplied with the current of the second current command value in step S111, the steering control process shown in FIG. 5 is terminated, and the process returns to step S101. On the other hand, if the varying rate of the steering angle is the reference rate or more, the process proceeds to step S109.

In step S109, since it has been determined that the varying rate of the steering angle is the reference rate or more, the automatic steering control device 30 causes the electric motor 40 to be supplied with a counterforce current which has the opposite positive/negative sign to that of the second current command value corresponding to the steering direction, as shown in FIG. 4(B). For example, in the example shown in FIG. 4(B), a positive second current command value is calculated to correspond to right steering, and therefore the automatic steering control device 30 causes a counterforce current of a negative current value to be supplied to the electric motor 40.

If it is determined in step S104 that the steerable angle is not less than the threshold al, the process proceeds to step S110 without suppressing the upper limit value of the second current command value. In step S110, the second current command value is calculated within a range defined by the initial value of the upper limit value of the second current command value. In step S111, the electric motor 40 is supplied with a current of the second current command value calculated in step S110.

If it is determined in step S103 that the first control is not being performed, the process proceeds to step S112, and the second control is performed in steps S112 to S115, as shown in FIG. 2(B).

Specifically, in step S112, the automatic steering control device 30 determines whether the steerable angle is the threshold β2 or more, as shown in FIG. 2(B). If the steerable angle is the threshold β2 or more, the process proceeds to step S113, while if the steerable angle is less than the threshold β2, the upper limit value of the second current command value is maintained at zero as shown in FIG. 2(B), and the steering control process shown in FIG. 5 is terminated and returns to step S101.

In step S113, as shown in FIG. 2(B), the automatic steering control device 30 refers to the correspondence relationship between the steerable angle and the upper limit value of the second current command value and calculates the upper limit value of the second current command value on the basis of the steerable angle. In the present embodiment, the correspondence relationship between the steerable angle and the upper limit value of the second current command value is prescribed, as shown in FIG. 2(B), such that the upper limit value of the second current command value increases from zero to the initial value within a range in which the steerable angle comes from β2 to β1. The automatic steering control device 30 refers to this correspondence relationship to calculate the upper limit value of the second current command value.

In step S114, the automatic steering control device 30 calculates the second current command value on the basis of the upper limit value of the second current command value calculated in step S113. The second current command value can be calculated in the same manner as that in step S106. In the subsequent step S115, the second current command value calculated in step S114 is output to the steering assist control device 20 under the control by the automatic steering control device 30. Through this operation, the electric motor 40 is supplied with a current of the second current command value calculated in step S114.

In the present embodiment, the steering control process shown in FIG. 5 is periodically repeated and can thereby control the upper limit value of the second current command value in accordance with the steerable angle, as shown in FIGS. 2(A) and 2(B). This allows the steering angle to moderately vary before the steering device 10 reaches the mechanical limit, as shown in FIGS. 3(A) and 3(B) and FIGS. 4(A) and 4(B).

In the present embodiment, if the first control is being executed (step S103=Yes) and the steerable angle is not less than the threshold α1 (step S104=No), suppression of the upper limit value of the second current command value is not performed. The second current command value is calculated within a range defined by the initial value of the upper limit value of the second current command value so that the vehicle can be guided to a target position (step S110).

If the steerable angle comes to less than the threshold $\alpha 1$ (step S104=Yes), the upper limit value of the second current command value is calculated on the basis of the steerable angle such that, as shown in FIG. 2(A), the upper limit value of the second current command value is smaller as the steerable angle is smaller (step S105). The second current command value is calculated within a range defined by the calculated upper limit value of the second current command value (step S106). Consequently, as shown in FIG. 3(B), as the steerable angle is smaller, the second current command value is smaller. This allows the steering angle to moderately vary, as shown in FIG. 3(A).

If the first control is being executed (step S103=Yes), the steerable angle is less than the threshold $\alpha 1$ (step S104=Yes), and the varying rate of the steering angle is a predetermined reference rate or more, as shown in FIG. 4(A) (step S108=Yes), the electric motor 40 is supplied with a counterforce current which has the opposite positive/negative sign to that of the second current command value for the steering direction, as shown in FIG. 4(B) (step S109).

After the steerable angle has come to the threshold $\alpha 2$ as shown in FIG. 2(B), the second control is executed (step S103=No). Until the steerable angle comes back to the threshold $\beta 2$, the second current command value is maintained at zero as shown in FIG. 2(B) (step S112=No). If the steerable angle comes back to the threshold $\beta 2$ or more, the upper limit value of the second current command value is increased in accordance with the steerable angle as shown in FIG. 2(B) (step S113). A second current command value to achieve the target position is calculated within a range defined by the upper limit value of the second current command value set in step S113. The automatic steering control is thereby performed (steps S114 and S115).

As described above, according to the present embodiment, when the steerable angle, which can be understood as a margin for the steering device 10 before reaching the mechanical limit, comes to less than the threshold $\alpha 1$, the upper limit value of the second current command value can be suppressed. It allows the steering angle to moderately vary before the steering device 10 reaches the mechanical limit, thereby to effectively prevent a driver from feeling uncomfortable, which would be caused from unexpected release of the steering of the steering device 10 by reaching the mechanical limit against the driver's intention in the automatic steering control. Particularly in automatic steering control, it is more difficult for a driver to predict that the steering by the steering device 10 is released compared with the case in which the driver actually performs steering operation. If the steering by the steering device 10 is unexpectedly released, an uncomfortable feeling given to the driver may be large. The automatic steering control in the present embodiment allows the steering angle to moderately vary before the steering device 10 reaches the mechanical limit, and there can thus be obtained a significant effect of mitigating an uncomfortable feeling given to the driver.

Moreover, according to the present embodiment, when the steerable angle comes to less than the threshold $\alpha 1$, the second current command value itself is not suppressing, but the upper limit value of the second current command value is suppressed. It allows that the second current command value can be appropriately calculated, in accordance with the target position in the automatic steering control, within a range which is not beyond the upper limit value of the second current command value, and the vehicle can be properly guided to the target position.

Furthermore, according to the present embodiment, when the varying rate of the steering angle is a reference rate or more, the electric motor 40 is supplied with a current which has the opposite positive/negative sign to that of the second current command value corresponding to the steering direction of the steering. It is thereby possible to effectively prevent the steering device 10 from reaching the mechanical limit such as due to inertial force of the electric motor 40 even when the second current command value is set to zero.

In addition, according to the present embodiment, in the first control as shown in FIG. 2(A) and the second control as shown in FIG. 2(B), the thresholds $\alpha 1$ and $\alpha 2$ and the thresholds $\beta 1$ and $\beta 2$ are different. It allows that the control of the upper limit value of the second current command value can be provided with a hysteresis, which can effectively prevent the hunting such as due to noises.

According to the present embodiment, the upper limit value of the second current command value is set to zero before the steerable angle comes to zero, i.e., before the steering device 10 reaches the mechanical limit, as shown in FIG. 2(A). It allows that the steering can thus be steadily released before the steering device 10 reaches the mechanical limit even when differences of the mechanical limit occur among vehicles of the same vehicle type due to manufacturing errors. It is therefore possible to mitigate an uncomfortable feeling given to the driver.

Embodiments heretofore explained are described to facilitate understanding of the present invention and are not described to limit the present invention. Therefore, it is intended that the elements disclosed in the above embodiments include all design changes and equivalents to fall within the technical scope of the present invention.

For example, in the above-described embodiments, a configuration is exemplified in which the thresholds $\beta 1$ and $\beta 2$ in the second control are set larger than the thresholds $\alpha 1$ and $\alpha 2$ in the first control to provide the automatic steering control with a hysteresis. In addition to this configuration, however, an additional configuration may be provided such that the thresholds $\beta 1$ and $\beta 2$ in the second control are determined on the basis of a self aligning torque of the steering device 10. Specifically, the automatic steering control device 30 can calculate the self aligning torque on the basis of the tire turning angle and the wheel alignment angle, and can increase the upper limit value of the second current command value with an amount corresponding to the self aligning torque. This can more appropriately prevent hunting of the steering device 10.

In the above-described embodiments, the present invention has been described by exemplifying a scene in which the vehicle is guided to a target parking position, but the present invention should not be understood as being applicable only to the above scene. For example, the present invention can also be applied to various scenes including a scene in which automatic traveling is performed such that an own vehicle automatically travels to follow a forward vehicle. That is, the present invention can be applied not only to a scene in which a fixed position such as a target parking position is set, but also to a scene in which a variable position such as the position of a forward vehicle is set.

In the above-described embodiments, the steering device 10 corresponds to the steering mechanism of the present invention, the electric motor 40 corresponds to the drive unit of the present invention, and the automatic steering control device 30 corresponds to the detection unit and the control unit of the present invention.

The invention claimed is:

1. A steering control device for a vehicle, the steering control device controlling a steering device, the steering device having a steering mechanism configured to steer wheels in accordance with a steering angle of a steering wheel and a drive unit configured to provide the steering mechanism with steering force for the wheels, the steering control device comprising:
a detection unit configured to detect the steering angle; and
a control unit configured to:
calculate a target steering angle required for the vehicle to be guided to a target position;
calculate a target value of a current required for the drive unit to be supplied to achieve the target steering angle, as a current command value; and
execute automatic steering control to automatically control steering operation of the steering mechanism by causing the drive unit to be supplied with the current of the current command value,
wherein, when an absolute value of the steering angle detected by the detection unit comes from a predetermined first threshold to a steering angle, larger than the first threshold, at which the steering mechanism does not yet reach a critical point of a mechanistic steerable range in the automatic steering control, the control unit decreases an upper limit value of an absolute value of the current command value as the absolute value of the steering angle increases so that the upper limit value of the absolute value of the current command value comes to zero before the steering angle detected by the detection unit comes to a steering angle at which the critical point is reached.

2. The steering control device for a vehicle according to claim 1, wherein
the control unit calculates, as a steerable angle, an angle difference between the steering angle detected by the detection unit and a steering angle when the steering mechanism reaches a critical point of a mechanistic steerable range, and
the control unit determines that the absolute value of the steering angle comes to the first threshold or more when an absolute value of the steerable angle comes to less than a predetermined determination value.

3. The steering control device for a vehicle according to claim 1, wherein,
when the absolute value of the steering angle comes to the first threshold or more and the steering angle is varying at a predetermined reference rate or more, the control unit causes the drive unit to be supplied with a current which has an opposite positive/negative sign to that of the current command value corresponding to a present steering direction.

4. The steering control device for a vehicle according to claim 1, wherein the control unit executes a first control and a second control, the first control comprising:
setting the upper limit value of the absolute value of the current command value to an initial value when the absolute value of the steering angle is less than the first threshold;
decreasing the upper limit value of the absolute value of the current command value as the absolute value of the steering angle increases when the absolute value of the steering angle is the first threshold or more and less than a second threshold larger than the first threshold; and
setting the upper limit value of the absolute value of the current command value to zero when the absolute value of the steering angle comes to the second threshold,
the second control comprising:
maintaining the upper limit value of the absolute value of the current command value at zero when the absolute value of the steering angle is a third threshold or more after coming to the second threshold, the third threshold being smaller than the second threshold;
increasing the upper limit value of the absolute value of the current command value as the absolute value of the steering angle decreases when the absolute value of the steering angle is less than the third threshold and not less than a fourth threshold smaller than the third threshold; and
returning the upper limit value of the absolute value of the current command value to the initial value when the absolute value of the steering angle comes to less than the fourth threshold.

5. The steering control device for a vehicle according to claim 4, wherein
the control unit sets the third threshold and/or the fourth threshold on a basis of a self aligning torque which is transmitted to the steering mechanism.

6. A steering control method for a vehicle, the steering control method comprising controlling a steering device, the steering device having a steering mechanism configured to steer wheels in accordance with a steering angle of a steering wheel and a drive unit configured to provide the steering mechanism with steering force for the wheels,
the steering control method comprising:
detecting the steering angle;
calculating a target steering angle require for the vehicle to be guided to a target position, calculating a target value of a current required for the drive unit to be supplied to achieve the target steering angle, as a current command value, and executing automatic steering control to automatically control steering operation of the steering mechanism by causing the drive unit to be supplied with the current of the current command value; and
when an absolute value of the steering angle detected by the detection unit comes from a predetermined first threshold to a steering angle, larger than the first threshold, at which the steering mechanism does not yet reach a critical point of a mechanistic steerable range in the automatic steering control, decreasing an upper limit value of an absolute value of the current command value as the absolute value of the steering angle increases so that the upper limit value of the absolute value of the current command value comes to zero before the steering angle detected comes to a steering angle at which the critical point is reached.

* * * * *